United States Patent [19]

Helt et al.

[11] 4,079,477
[45] Mar. 21, 1978

[54] APPARATUS FOR CLEANING PISTON RING GROOVES

[76] Inventors: Raymond E. Helt, 4700 S. 5-15, Pocatello, Id. 83201; Stanley M. Davis, Box 84, Salmon, Id. 83467

[21] Appl. No.: 711,625

[22] Filed: Aug. 4, 1976

[51] Int. Cl.$^2$ .............................................. B60S 5/00
[52] U.S. Cl. ........................................... 15/104.01 P
[58] Field of Search ................ 15/104.01 R, 104.01 P; 82/4

[56] References Cited

U.S. PATENT DOCUMENTS

| | | | |
|---|---|---|---|
| 1,419,790 | 6/1922 | Weddle | 15/104.01 P |
| 1,601,139 | 9/1926 | Morgal | 15/104.01 P X |
| 1,848,418 | 3/1932 | Fall | 15/104.01 P X |
| 2,362,780 | 11/1944 | Stine | 15/104.01 P |
| 3,200,429 | 8/1965 | Davis | 15/104.01 P |
| 3,233,268 | 2/1966 | Lorson | 15/104.01 P |

*Primary Examiner*—Edward L. Roberts
*Attorney, Agent, or Firm*—K. S. Cornaby

[57] ABSTRACT

This invention relates to an apparatus for cleaning accumulated carbon and other material from the ring grooves of pistons. The apparatus includes a cylindrical housing adapted to accommodate a piston therein, and a plurality of mutually spaced apart cleaning blades disposed along the axial length of the interior of the housing. The blades are adapted to insert into ring grooves of a piston when the piston is placed within the housing. Biasing means are included to urge the cleaning blades into the ring grooves, so that as the piston is rotated with respect to the housing, the blades can clean out accumulated carbon and other foreign material. The apparatus also includes means disposed within the housing for holding the piston snugly within the housing to prevent radial displacement of the piston as it is being rotated within the housing.

8 Claims, 2 Drawing Figures

4,079,477

APPARATUS FOR CLEANING PISTON RING GROOVES

BACKGROUND OF THE INVENTION

Internal combustion engines, such as those found in automobiles, trucks, and other vehicles, contain reciprocating pistons outfitted with expandable rings fitted into grooves cut into the exterior circumferences of the pistons. The rings are designed to expand and contract as the pistons and piston walls expand and contract due to heat generated by the engine in order to prevent the passage of oil into the firing chamber and to contain the combustion products of the engine within the combustion chamber. Over periods of use, the ring grooves become contaminated with burned carbon and other foreign materials generated through the combustion cycle. Contamination of the grooves prevents efficient expansion and contraction of the rings and diminishes the efficiency of the engine.

Typically after prolonged periods of use, internal combustion engines may be dismantled and the rings of the pistons replaced. If the accumulation of carbon and other foreign matter in the grooves is great enough to prevent proper functioning of the rings, the grooves are normally cleaned of the carbon and other foreign material. In the past this has been a very difficult and time consuming task. Mechanics have resorted to sharp instruments, such as chisels, knives, screw drivers, and other objects to clean the hardened carbon from the grooves. Even skilled mechanics have had great difficulty in preventing scoring or scratching of the grooves as the hardened carbon has been chipped away.

Attempts have been made to place commercial products on the market which provide for the cleaning of a single groove at a time on a piston. However, experiences prove that such devices are as time consuming as traditional methods of chipping by hand, and moreover do not clean all of the foreign material and accumulated carbon from the grooves, so that a manual second cleaning has been required. There is nothing known in the act or in the marketplace which will permit a mechanic to efficiently clean all of the grooves on a piston quickly and efficiently.

It is an objective of this invention to provide an apparatus for the efficient and fast cleaning of all ring grooves in a piston at one time. It is a further objective to provide means for bearing the pressure exerted by cleaning blades within the grooves of the pistons.

SUMMARY OF THE INVENTION

The apparatus of the invention is adapted to clean simultaneously all ring grooves in a piston. The apparatus has a generally cylindrical shaped housing, which can be constructed in two halves with appropriate means for securing the halves together around a conventional piston. The housing can also be of unitary construction with provision for insertion of the piston into the housing through one end thereof. The housing can be constructed of any material which will withstand the pressures placed upon it. For example, light weight steel and even some hardened plastics could be used in construction of the housing.

A plurality of cleaning blades are disposed within the housing and are arranged in mutually spaced apart relationship along the axial length of the housing interior. The blades extend circumferentially around the interior circumference of the housing and are spaced so that each blade can be inserted into a ring groove of a piston when the piston is in place within the housing. The cleaning blade can be of unitary construction, or can comprise an elongate member attached at one end to the housing and having a sharp tooth patched to the other end of the elongate member. The tooth can be adapted to fill the ring groove so that the entire cross sectional area of the groove is cleaned out by the tooth as the piston is rotated with respect to the cleaning blades and the housing. The cleaning blades can be adjustable with respect to the spacing between the blades, so that the apparatus can accommodate pistons having grooves in various locations upon their surfaces. Preferably, the cleaning blades are removable from the housing, in the event of breakage or dulling of the blade or tooth.

The apparatus has biasing means for exerting pressure upon the cleaning blade to hold the blade within the ring groove with sufficient pressure to remove the accumulated carbon and other foreign material from the groove. Preferably, the biasing means is adjustable so that appropriate pressure can be exerted upon the cleaning blade to match the force exerted by the blade to the hardness of the carbon and other foreign matter found within the groove. By adjusting the biasing force, care can also be taken to prevent scoring of the surface of the groove by the cleaning blade.

An additional feature of the invention includes means for insuring that the piston when in place within the housing is not displaced radially with respect to the housing as the piston is rotated. Such radial displacement would possibly result in scoring or scratching of the groove surface by the cleaning blade. It would also reduce the efficiency of the cleaning process by permitting the blade to pass over hardened carbon material rather than cleaning it from the groove. Preferably, such means would comprise a series of rollers disposed along the interior surface of the cylindrical housing. The rollers would fit snugly against the external surface of the piston and hold it snugly in place within the housing, while permitting the piston to rotate therein. Under certain circumstances, the housing itself could be constructed to such close tolerances, that a particular sized piston would fit snugly within the housing in the absence of such roller means. The apparatus also preferably has handle means for ease in rotating the apparatus around the piston.

THE DRAWINGS

The best mode presently contemplated for carrying out the invention is illustrated in the accompanying drawing, in which:

FIG. 1 is a top plan view of the apparatus showing a piston in place in the apparatus; and FIG. 2 a side elevational section taken along broken line 2—2 of FIG. 1 showing placement of the cleaning blades with respect to the piston ring grooves.

DETAILED DESCRIPTION OF THE ILLUSTRATED EMBODIMENT

Figure 1:
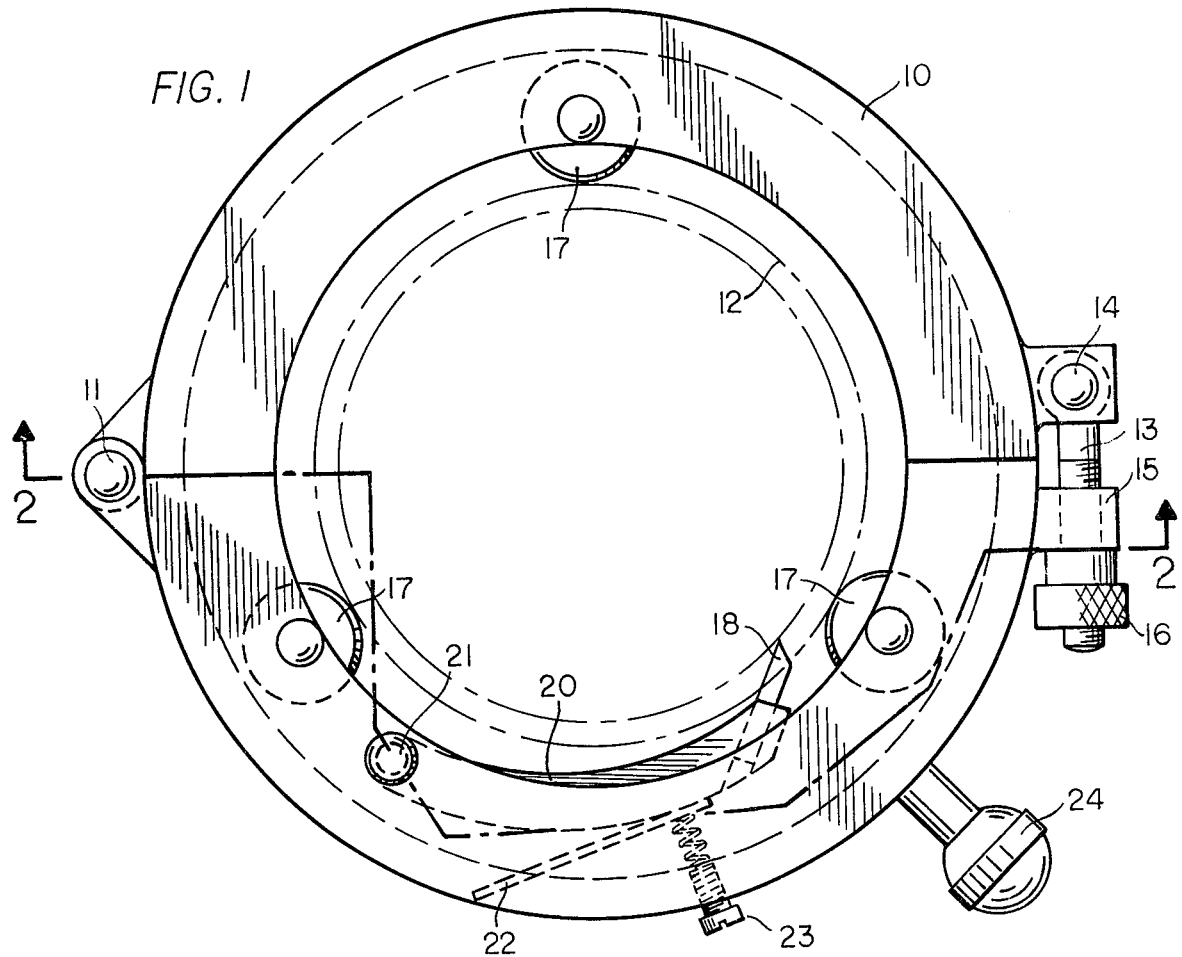
Figure 2:
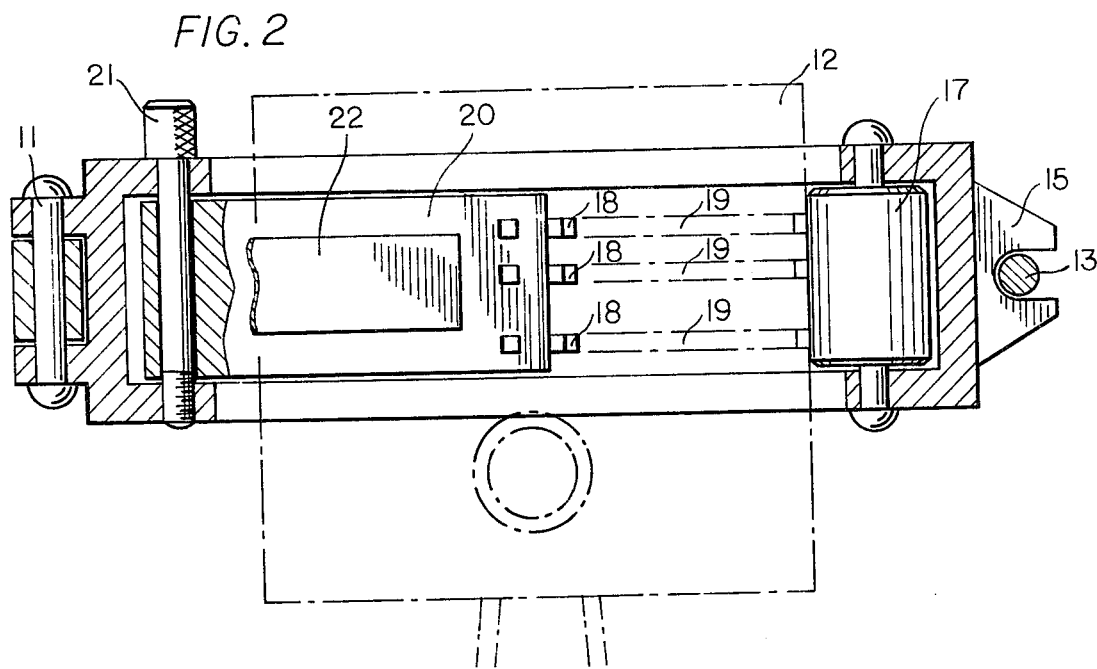

As shown in FIGS. 1 and 2, a preferred embodiment of the invention has a housing 10 which is generally cylindrical in shape. Housing 10 is formed of two halves which are aligned with appropriate hinge means 11 on one side thereof, so that the two halves can be opened and a piston 12 inserted into the housing 10. The other side of the two halves of housing 10 can be secured together by bolt means 13, which in this embodiment is moveably secured 14 to one half of housing 10, while the other half is secured to the bolt means by flange 15 and nut 16.

A plurality of roller means 17, in this embodiment three are rotatably secured to the interior of housing 10, so that they fit snugly around piston 12 and prevent radial displacement of the piston as it is rotated with respect to housing 10. While more or less than three rollers 17 can be used, this number appears to be optimum.

A plurality of cleaning teeth 18, in this embodiment three, are disposed in mutually spaced-apart relationship along the axial length of the interior of the housing 10 in register with the ring grooves 19 in piston 12. Cleaning teeth 18 are replaceably secured to one end of elongate member 20, which is moveably attached at its other end to housing 10 by means of a bolt 21. This enables the blade means comprising member 20 and teeth 18 to be replaced easily in the event of breakage. Teeth 18 are disposed at such an angle with respect to groove 19 that maximum pressure can be exerted upon the groove by biasing means in this embodiment leaf spring 22, to force hardened carbon and other foreign material from the groove 19 without scoring or or otherwise damaging the grooves.

Leaf spring 22 applies pressure to elongate member 20, which may also be fabricated of spring steel or the like. In this embodiment, leaf spring 22 is made adjustable as to the amount of force exerted upon member 20 by a spring-loaded screw 23, which extends for convenience to the exterior of housing 10.

Also for convenience, one or more handles 24 can be attached to housing 10 to aid in rotating the housing with respect to piston 12 when in place.

Whereas the invention is illustrated and described herein with respect to certain preferred embodiments, it is to be understood that many variations are contemplated without departing from the inventive concepts which are particularly pointed out in the appended claims.

We claim:

1. A piston ring groove cleaning apparatus for cleaning ring grooves in piston surfaces, comprising in combination:

cylindrical housing having an internal circumferential dimension sufficient to accommodate the exterior circumference of a piston when the piston is placed in the housing;

elongate blade support member pivotally attached within said housing at the rearward end of said elongate member, with the opposite leading end of said member disposed for movement in the direction of rotation of said apparatus around said piston;

a plurality of cleaning blades attached to the leading end of said elongate blade support member each of said cleaning blades defining a leading end having a cutting thereof, said blades arranged in predetermined spaced-apart relationship along the axial length of the interior circumference of said housing for inspection of said cutting edges of said blades into ring grooves of a piston placed within said housing;

biasing means intermediate the ends of said elongate blade support member for urging said cleaning blades into the piston ring grooves and providing a biasing force against the blades to clean carbon from the groove and prevent scarring of the groove, said biasing means permitting outward movement of said blade support means to surface;

means for preventing radial displacement of a piston with respect to said housing while the piston is in place within said housing.

2. A cleaning apparatus as set forth in claim 1, wherein said housing is constructed of two halves with means for securing the two halves together around a piston.

3. A cleaning apparatus as set forth in claim 1, wherein the interior dimension of said housing is adjustable to accommodate different sized pistons.

4. A cleaning apparatus as set forth in claim 1, wherein said elongate blade support member is constructed of spring steel having inherent biasing toward the center of said housing.

5. A cleaning apparatus as set forth in claim 1, wherein said biasing means is manually adjustable to vary the force exerted on the cleaning blades.

6. A cleaning apparatus as set forth in claim 5, wherein said biasing means comprises a spring-loaded screw extending through the circumference of said housing to contact said cleaning blades and urge said blades into the piston ring grooves.

7. A cleaning apparatus as set forth in claim 1, wherein said means for preventing radial displacement of the piston comprise a plurality of rollers disposed about the interior circumference of the housing for holding the piston snugly in place and permitting rotation of the piston within the housing.

8. A cleaning appartus as set forth in claim 1, including at least one handle extending from said housing to accommodate the rotation of the housing with respect to the piston when in place therein.

* * * * *